United States Patent [19]

Mayfield, III

[11] Patent Number: 4,858,783
[45] Date of Patent: Aug. 22, 1989

[54] DISPENSERS

[75] Inventor: John T. Mayfield, III, Clarkston, Ga.

[73] Assignee: Modular Engineering Corporation, Stone Mountain, Ga.

[21] Appl. No.: 162,657

[22] Filed: Mar. 1, 1988

[51] Int. Cl.[4] .............................................. B65H 1/08
[52] U.S. Cl. ..................................... 221/59; 221/271; 312/43; 312/140.4
[58] Field of Search ...................... 221/271, 279, 59; 312/43, 45, 42, 71, 49, 61, 140.4; 108/136; 29/701, 809, 282

[56] References Cited

U.S. PATENT DOCUMENTS

| | | | |
|---|---|---|---|
| 1,248,320 | 11/1917 | Hamilton | 312/45 |
| 1,748,433 | 2/1930 | Wetzell et al. | 221/271 |
| 2,534,169 | 12/1950 | Hope | 221/59 |
| 2,609,265 | 9/1952 | Larsen | 312/71 |
| 3,159,368 | 12/1964 | Ahlbin et al. | 248/225 |
| 3,211,329 | 10/1965 | Boyd | 221/279 |
| 4,234,101 | 11/1980 | Pastore | 221/241 |

Primary Examiner—Joseph J. Rolla
Assistant Examiner—Kenneth Noland
Attorney, Agent, or Firm—Kilpatrick & Cody

[57] ABSTRACT

Dispensers for nested items such as cups or lids. Dispensers according to the present invention contain face plates which are easily removed so that the dispensers and their surrounding areas can be easily cleaned. One embodiment of dispensers according to the present invention includes a trim assembly and a container assembly for the items to be dispensed, which two assemblies can be attached as a unit to the face plate and removed with the face plate for quick and efficient cleaning and refilling. The face plates and trim assemblies may be color coded for aesthetic purposes and to differentiate various cup and lid sizes.

9 Claims, 5 Drawing Sheets

DISPENSERS

This application relates to dispensers for nested items such as cups and lids.

BACKGROUND OF THE INVENTION

Those who sell beverages frequently desire to have available at the pot of sale a variety of cup and lid sizes so that customers can purchase various sizes of drinks. As the number of available sizes of cups and lids continues to increase, demand increases for a versatile dispenser which can accommodate many cup and lid sizes.

Allowing the customer easily and conveniently to select cups and lids also becomes more important as more self-service soda fountains are placed in use. This trend also increases the need for a dispenser which can be easily refilled in minimum time by service personnel and which can be easily removed so that the vicinity of the dispenser can be conveniently and thoroughly policed and cleaned.

SUMMARY OF THE INVENTION

Dispensers according to the present invention are constructed so that the components which are exposed to users are easily removable. The dispensers and their mounting surfaces may thus be thoroughly and quickly cleaned. The exposed portions of such dispensers can also be provided in a variety of colors to allow users to identify various sizes of cups or lids by corresponding colors. In one embodiment of the invention the dispenser face plate is attached to an attractive trim assembly and also to the dispenser's container which holds the items to be dispensed. The face plate and thus the container may be removed from the mounting surface for filling in a remote location while a different face plate and container can be placed in its previous location in the mounting surface.

It is therefore an object of the present invention to provide dispensers having face plates which can be easily removed, which are interchangeable and which can be provided in various colors.

It is an additional object of the present invention to provide dispensers which are easily removable from their mounting locations to allow those locations to be easily cleaned and the dispensers to be interchangeable and easily refilled.

It is an additional object of the present invention to provide dispensers which accommodate a large range of cup and lid sizes.

It is an additional object of the present invention to provide dispensers which attractively and efficiently display and present cups and lids.

It is an additional object of the present invention to provide dispensers which can be mounted to surfaces with the need to drill holes of only one size.

Other objects, features, and advantages of the present invention will become apparent with reference to the remainder of this document.

DETAILED DESCRIPTION OF THE DRAWINGS

Figure 1:
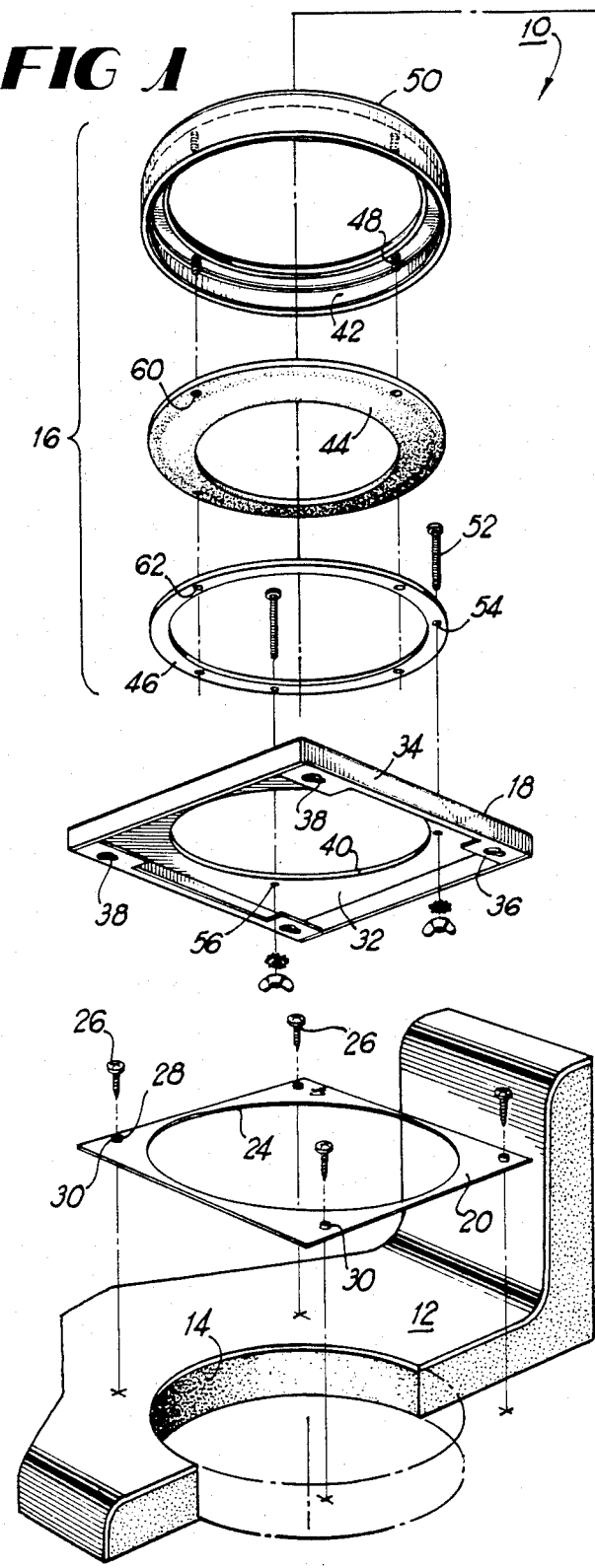
FIG. 1 is an exploded side elevational view of a first embodiment of a dispenser according to present invention.
Figure 1:
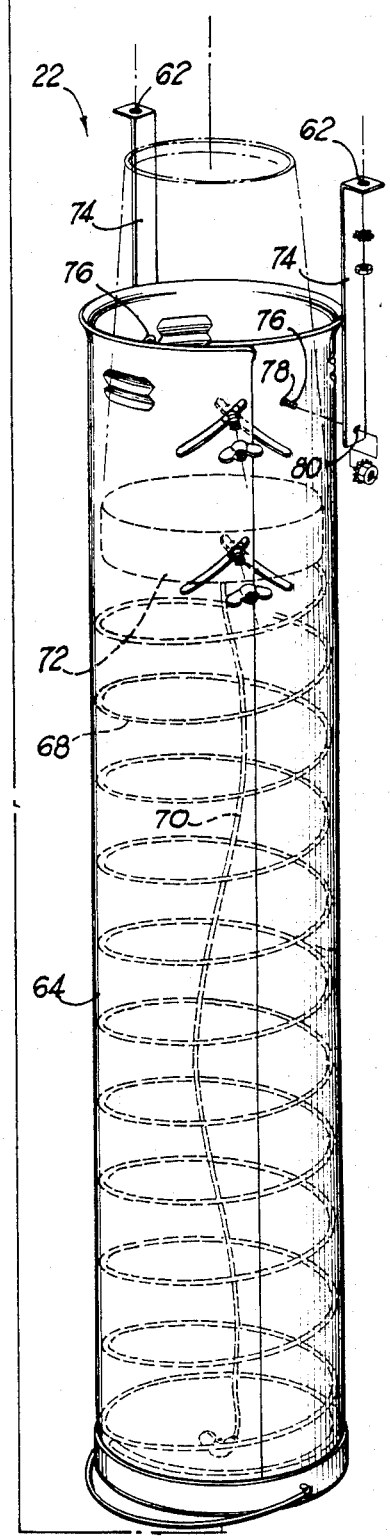

FIG. 1 shows a first embodiment of a dispenser 10 according to the present invention. Dispenser 10 may be mounted upon a mounting surface 12 such as a counter, a table, or another suitable relatively flat and horizontal or vertical surface. A mounting opening 14 of appropriate size is formed in surface 12 to accommodate dispenser 10.

Dispenser 10 generally comprises a trim assembly 16, a face plate 18, a mounting template 20, and a container assembly 22. Mounting template 20 is secured to the mounting surface 12. Trim assembly 16, face plate 18, and container assembly 22 are attached to one another and are removably mounted to mounting template 20 for easy removal and replacement.

Mounting template 20 is preferably square or rectangular in shape and has a template opening 24 which is approximately coaxially located with mounting opening 14 in surface 12. Template opening 24 is preferably circular in shape, but it may also be square or of other appropriate shape. Template opening 24 may be useful for scribing surface 12 to form mounting opening 14. Template 20 may also contain an arrow 26 to show service personnel which way to orient face plate 18. Mounting template 20 is preferably manufactured from 0.036 stainless steel, but it may also be manufactured of aluminum or other appropriate material.

Mounting fasteners 26 hold mounting template 20 in place. They are preferably conventional wood screws, and a portion of their shanks preferably extends above the surface of mounting template 20 so that they can capture portions of face plate 18. Bosses 28 formed on fastener holes 30 of mounting template 20 assist in this purpose and allow mounting fasteners 26 to fasten mounting template 20 securely in place while at the same time allowing portions of mounting fastener 26 shanks to extend above the surface of template 20.

Face plate 18 is the portion of dispenser 10 that is attached to surface 12 by mounting fasteners 26. Face plate 18 is preferably square or rectangular in shape, but it may also be of other desirable shape. It is preferably a truncated box structure with an upper surface 32 and side surfaces 34 as shown in FIG. 1. Face plate 18 may simply be a flat plate, however. Face plate 18 shown in FIG. 1 has flanges 36 formed by bending inwardly portions of side surfaces 34. Flanges 36 which are generally parallel to upper surface 32 of face plate 18 contain keyed mounting fastener openings 38 which allow face plate 18 to be removably captured by mounting fasteners 26 which extend from mounting surface 12.

Face plate 18 may be formed of aluminum and provided in various colors to allow face plates of various colors to indicate various sizes of items such as cups or lids. Polyurethane paint finishes are preferred because of their durability, but other finishes may also be used.

Face plate 18 also contains an opening 40 through which items are dispensed and which correspond axially to mounting template opening 24 and mounting opening 14. Opening 40 is preferably circular in shape but it may be of other shapes as desired.

Trim assembly 16 trims face plate 18. Trim assembly 16 preferably comprises a trim rim body 42 to which a flexible lip 44 is held in place by a retainer 46 fastened to rim body 42 with trim assembly fasteners 48. Body 42, lip 44, and container 46 may be ring-shaped to accommodate opening 40 in face plate 18; they may be of other shapes such as square or rectangular as desired. Lip 44 is preferably of flexible plastic material in order to grip the exterior of body 64 as shown more clearly in FIG. 5. A trim rim 50 fits over trim rim body 42 to finish the appearance of the trim assembly 16. Rim 50 may be of plastic material and provided in various colors to match face plates 18 and assist customers in selection of cup sizes. Fasteners 48 are preferably nuts and bolts.

Trim assembly 16 in the preferred embodiment is attached to face plate 18 using face plate fasteners 52 which extend through face plate fastener holes 54 in retainer 46 and face plate 18. Face plate fasteners 52 may be nuts and bolts, but they may also be rivets or other desirable fasteners. In the preferred embodiment, face plate fasteners 52 are placed through fastener holes 54 in retainer 46 before trim assembly 16 is fastened to face plate 18. After face plate fasteners 52 are placed through retainer 46, retainer 46 is fastened to trim rim body 42 by trim assembly fasteners 48 which extend through trim assembly fastener holes 58 in rim body 42, 60 in lip 44, and 62 in retainer 46.

Figure 2:
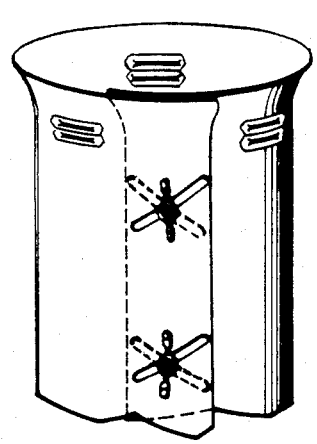
FIG. 2 is a side elevational view of a portion of the dispenser of FIG. 1.

Trim assembly fasteners 48 also serve another important purpose in the dispenser shown in FIG. 1. They fasten trim assembly 16 and thus face plate 18 to the container assembly 22 of the dispenser which holds the items to be dispensed. Container assembly 22 generally comprises a container body 64 which is elongated in shape and preferably cylindrical. Body 64 may also be box shaped or of other desirable shape to accommodate various sizes and types of cups. Body 64 is preferably formed of sheet metal material, but it may also be formed of appropriate plastics. It is expandable as shown in FIGS. 2 and 3.

Body 64 contains a follower 66 whose shape corresponds to the cross-sectional shape of body 64. Follower 66 is forced upwardly or toward the face plate 18 end of body 64 by a spring 68 such as is conventionally found in cup dispensers. Spring 68 and follower 66 may be stabilized by a stabilizer member 70 such as a length of chain or monofilament line. Follower 66, which may be of appropriate metal or plastic material, may have flanges 72 to allow it to avoid rotating in container body 64 and thus further to stabilize it. Flanges 72 may be fitted with protuberances such as nut heads to allow follower 66 to slide more easily in container body 64.

Container body 64 in the embodiment shown in FIG. 1 is connected to a plurality of straps 74. These straps are used to fasten container body 74 to trim assembly 16. Straps 74 may be connected to container body 64 by nuts 76 which extend through nut openings 78 in container body 64 and 80 in straps 74. Nuts 76 are preferably round headed and oriented so that their heads are inside of container body 64 to minimize the possibility that nuts 76 will interfere with operation of follower 72 or the dispensing of items from the dispenser. Straps 74 may be formed of sheet metal or other appropriate material.

Figure 3:
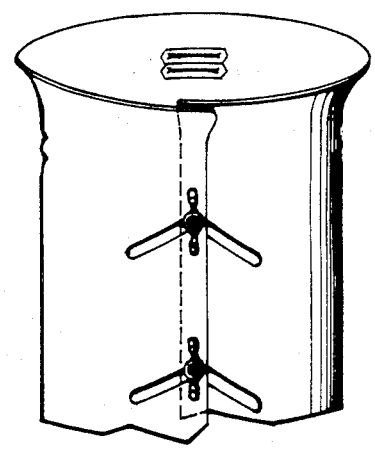
FIG. 3 is a side elevational view of the dispenser portion shown in FIG. 2 which has been expanded.
Figure 4:
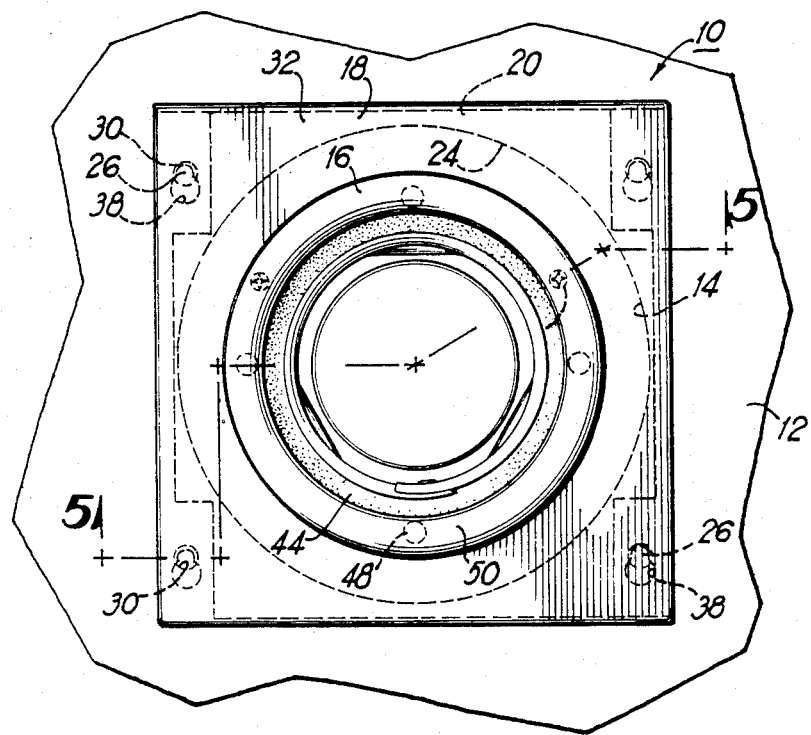
FIG. 4 is a top plan view of the dispenser shown in FIG. 1.
Figure 5:
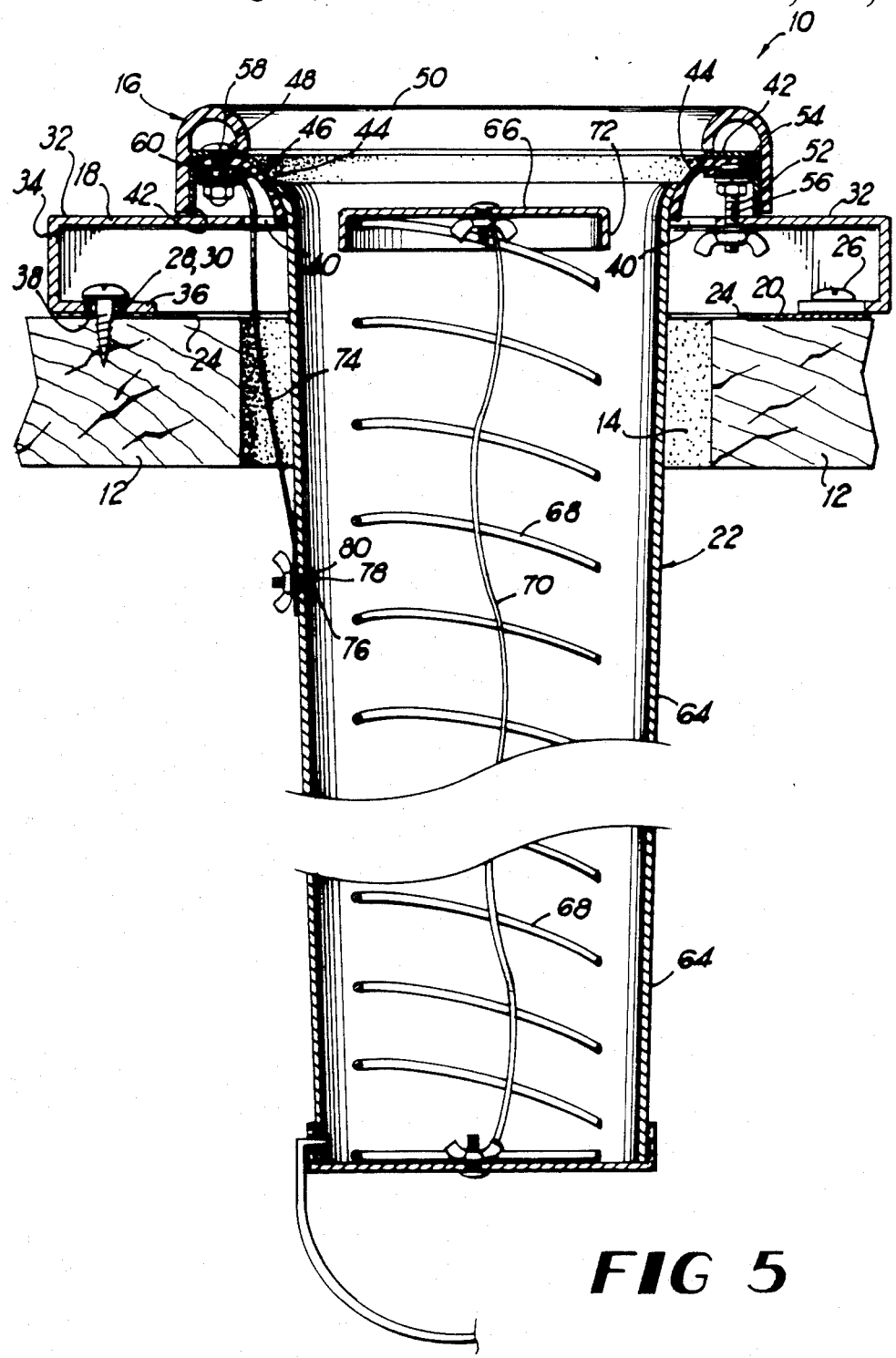
FIG. 5 is a cross-sectional view of the dispenser shown in FIG. 4, with the right-hand portion corresponding to section "*-*" in that figure.

Straps 74 are attached to trim assembly 16 using trim assembly fasteners 48 as shown most clearly in FIG. 3 to complete the trim assembly 16/face plate 18/container assembly 22 unit. The dispenser presents an attractive appearance to the customer as shown in FIG. 4 and is easily removed from surface 12. FIG. 4 together with FIG. 5 shows the manner in which dispenser 10 is constructed so that it is formed of durable preferably metallic structural material and yet presents an attractive colored plastic and polyurethane finish to the user and to personnel who must clean the dispenser.

Figure 6:
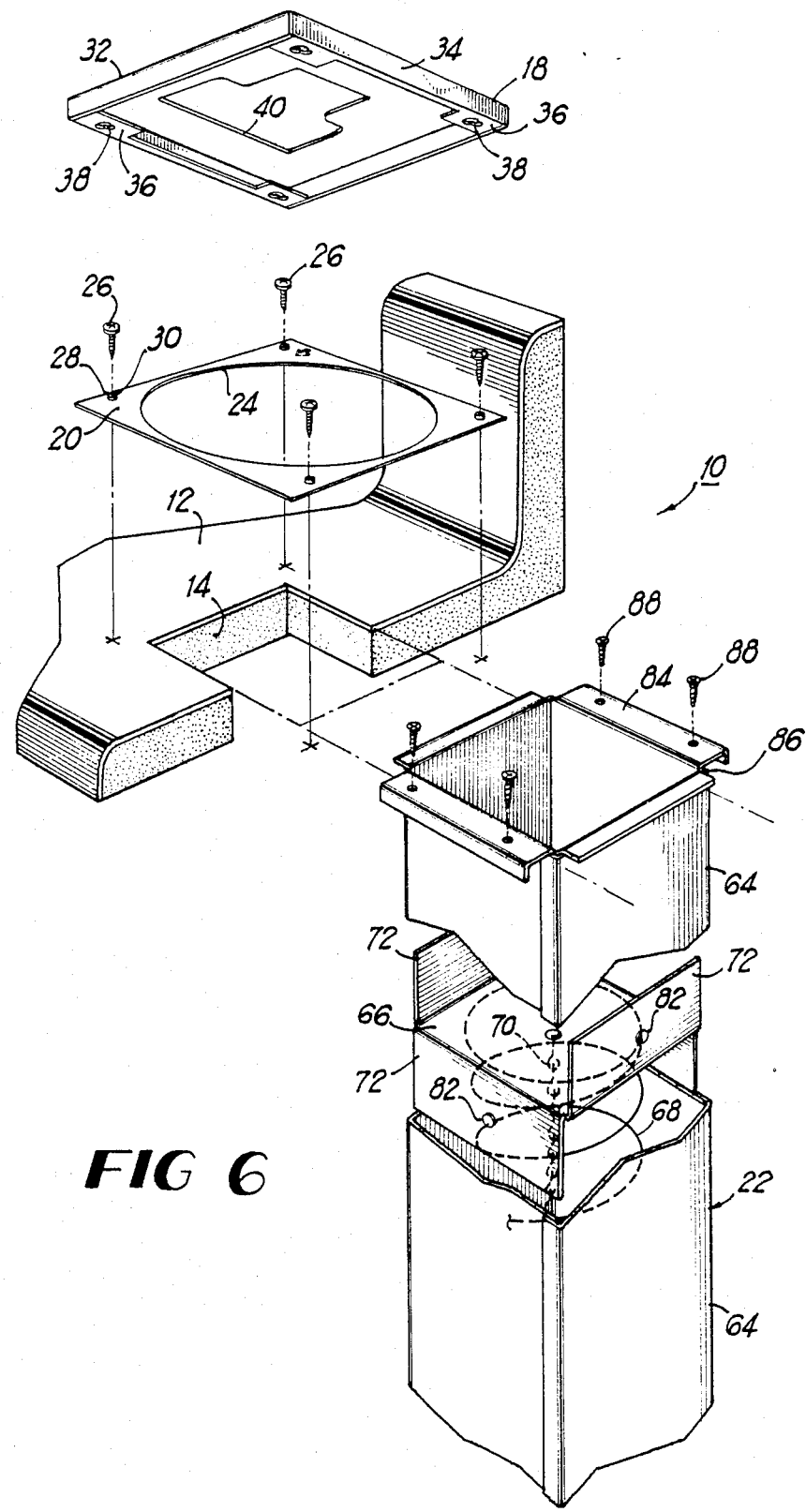
FIG. 6 is a perspective view of a second embodiment of a dispenser according to the present invention.
Figure 7:
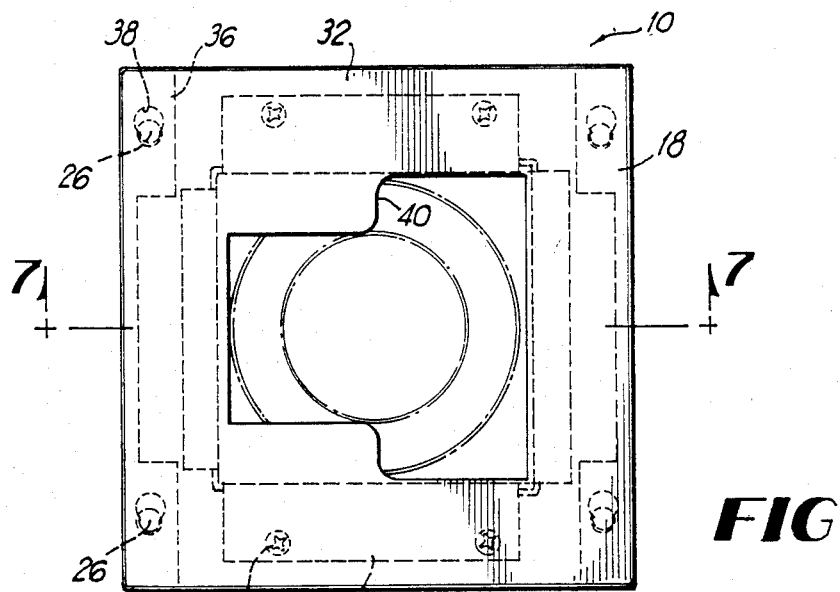
FIG. 7 is a top plan view of the dispenser shown in FIG. 6.
Figure 8:
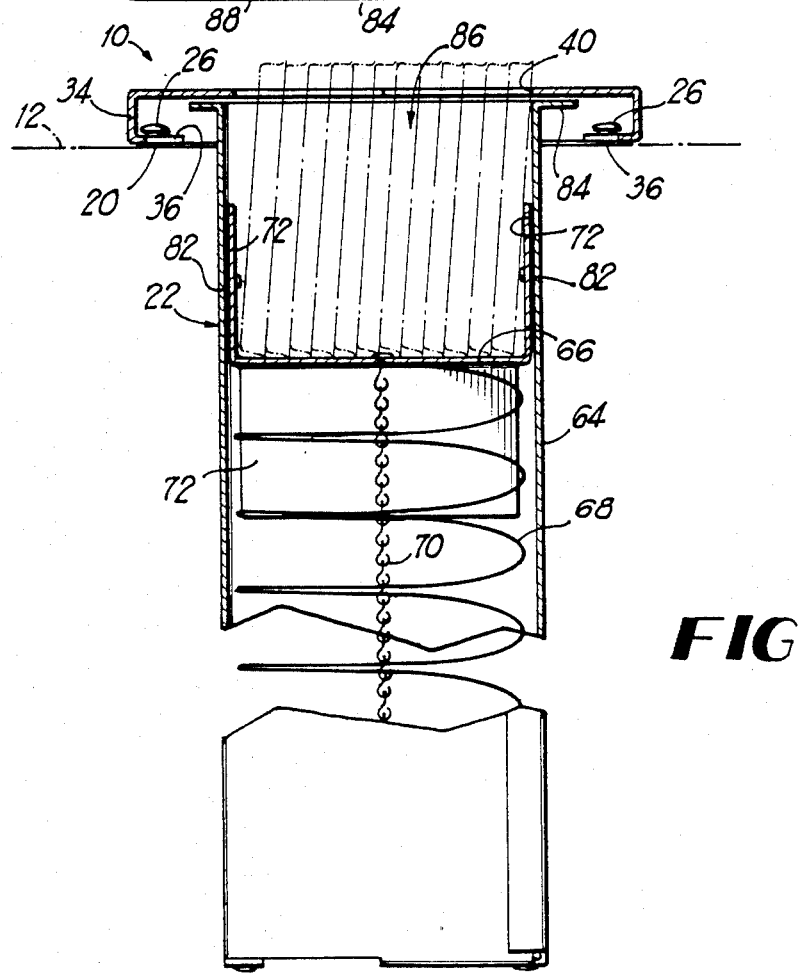
FIG. 8 is a cross-sectional view of section 7—7 of the dispenser shown in FIG. 6.

A second embodiment of a dispenser 10 according to present invention is shown in FIGS. 6–8. This embodiment may be used for cup lids and it essentially eliminates the need for a trim assembly 16. The container assembly 22 is not removed from surface 12 when face plate 18 is in this embodiment.

Template 20 may be identical to template 20 as shown in FIG. 1 above. It contains a template opening 24 and accommodates mounting fasteners 26 through fastener holes 30 and bosses 28 to allow portions of the shanks of fasteners 26 to extend above the surface of template 20.

Face plate 18 is also similar to the face plate 18 of FIG. 1. It preferably comprises an upper surface 32 joined by side surfaces 34 which are bent to form flanges 36 generally parallel to upper surface 32. Mounting fastener openings 38 are removably captured by mounting fasteners 26 to secure face plate 18 to surface 12 removably. Face plate 18 of dispensers 10 used to dispense lids may contain an opening as shown in FIG. 6 which allows lids to be dispensed easily and efficiently. The opening shown in FIG. 6 is generally T-shaped so that lids can be stacked edgewise with respect to face plate 18 in dispenser 10. The Tshape prevents the entire short stack of lids from being pulled out of dispenser 10 when one lid is selected and pulled by a customer.

Container body 64 in the embodiment shown in FIG. 6 is an elongated box shape and contains a removable side section 82 so that the interior of the dispenser may be accessed. Body 64 may also be of any other desirable shape. Follower 66 is square shaped to accommodate the cross section of body 64. Pairs of opposing edges of follower 66 are bent upward and downward respectively to form flanges 72 to minimize rotation of follower 66 and body 64. Once again, protuberances 82 may be placed in flanges 72 to allow follower 66 to slide more easily in body 64. Spring 68 and stabilizer member 70 as mentioned above in connection with the dispenser 10 of FIG. 1 are utilized to force follower 66 toward face plate 18 and to stabilize it. Stabilizer member 70 may once again be a chain, monofilament line, or other appropriate material.

Container body 64 of the embodiment of FIG. 6 has flanges 84 formed at its upper end 86. These flanges serve to mount container body 64 directly to mounting surface 12 using container body mounting fasteners 88. Fasteners 88 may be wood screws or other desirable fasteners. Flanges 84 preferably are L-shaped in cross section to allow container body 64 to extend in height slightly beyond mounting template 20.

The dispenser of FIG. 6 is mounted on surface 12 by first mounting template 20 using fasteners 26 and then mounting container body 64 using fasteners 88. Face plate 18 may then be attached to mounting fasteners 26 to provide a dispenser which is attractive and neat in appearance and which can be easily cleaned and which accommodates a variety of lid sizes.

The foregoing is provided for purposes of illustration, explanation and description of a preferred embodiment of the invention. Modifications and adaptations to this embodiment will be apparent to those of ordinary skill in the art and they may be made without deparing from the scope or spirit of the invention.

I claim:

1. A dispenser which extends through an opening in a mounting surface, comprising:
   (a) a mounting template having an opening corresponding to the opening in the mounting surface;
   (b) a plurality of mounting fasteners which fasten the mounting template to the mounting surface;
   (c) a face plate having an opening corresponding to the opening in the mounting surface and keyed holes to capture the mounting fasteners so that the face plate is removably attached to the mounting template;
   (d) a trim assembly attached to the face plate comprising:
      (i) a trim rim body, a lip for connecting the trim assembly to a container assembly, and a retainer fastened together by a plurality of trim assembly fasteners; and
      (ii) a trim rim slidably fitted on the trim rim body;
   (e) a plurality of face plate fasteners which fasten the trim assembly to the face plate; and
   (f) a container assembly attached to the trim assembly so that the container assembly and the trim assembly are removable as a unit with the face plate, comprising:
      (i) a container body;
      (ii) a plurality of container fasteners for fastening the container body to the retainer of the trim assembly;
      (iii) a follower which slides inside the container body;
      (iv) a spring for forcing the follower and thus items in the dispenser toward the trim assembly; and
      (v) a stabilizer member attached to the container body and the follower for stabilizing the follower.

2. A dispenser according to claim 1 in which the opening in the mounting surface, the mounting template and the face plate are circular.

3. A dispenser according to claim 2 in which the openings in the trim rim body, the trim rim, the lip and the retainer are circular-shaped and the container body is cylindrically shaped.

4. A dispenser according to claim 1 in which the trim rim is of plastic material and in which the trim rim and the face plate are each available in a variety of colors.

5. A dispeners according to claim 1 further comprising a plurality of straps attached to the container body for fastening it to the trim assembly and the trim assembly fasteners act as the container body fasteners to fasten the straps to the trim assembly.

6. A dispenser according to claim 1 in which the follower has flanges to stabilize it in the container body.

7. A dispenser according to claim 6 in which the stabilizer member is a chain attached to one end of the container body and to the follower.

8. A dispenser according to claim 1 in which the mounting fasteners are wood screws, a portion of whose shanks extend beyond the surface of the mounting template.

9. A dispenser according to claim 1 in which the trim assembly fasteners and the container body fasteners are nuts and bolts.

* * * * *